(12) United States Patent
Xu et al.

(10) Patent No.: US 11,513,673 B2
(45) Date of Patent: Nov. 29, 2022

(54) STEERING DEEP SEQUENCE MODEL WITH PROTOTYPES

(71) Applicant: Robert Bosch GmbH, Stuttgart (DE)

(72) Inventors: Panpan Xu, Santa Clara, CA (US); Liu Ren, Cupertino, CA (US); Yao Ming, Shenzhen (CN); Furui Cheng, Kowloon (CN); Huamin Qu, Kowloon (CN)

(73) Assignee: Robert Bosch GmbH, Stuttgart (DE)

( * ) Notice: Subject to any disclaimer, the term of this patent is extended or adjusted under 35 U.S.C. 154(b) by 103 days.

(21) Appl. No.: 16/711,007

(22) Filed: Dec. 11, 2019

(65) Prior Publication Data
US 2021/0181931 A1 Jun. 17, 2021

(51) Int. Cl.
*G06F 3/04847* (2022.01)
*G06N 3/08* (2006.01)
*G06F 3/0482* (2013.01)

(52) U.S. Cl.
CPC ........ *G06F 3/04847* (2013.01); *G06F 3/0482* (2013.01); *G06N 3/08* (2013.01)

(58) Field of Classification Search
CPC ...... G06F 3/04847; G06F 3/0482; G06N 3/08
See application file for complete search history.

(56) References Cited

U.S. PATENT DOCUMENTS

| 10,909,503 | B1 * | 2/2021 | Dias | G06Q 10/103 |
| 2014/0108341 | A1 * | 4/2014 | Marsden | G06F 16/275 |
| | | | | 707/623 |
| 2015/0153476 | A1 * | 6/2015 | Prange | G06F 17/10 |
| | | | | 703/2 |
| 2018/0129941 | A1 * | 5/2018 | Gustafson | G06N 5/02 |
| 2018/0373985 | A1 | 12/2018 | Yang et al. | |
| 2019/0146998 | A1 * | 5/2019 | Jin | G06F 9/46 |
| | | | | 718/104 |

OTHER PUBLICATIONS

Zhang et al. Deep Learning based Recommender System: A Survey and New Perspectives. Jul. 2018. ACM Computing Surveys, vol. 1, No. 1, Article 1. pp. 1-25. (Year: 2018).*
Ming et al., Interpretable and Steerable Sequence Learning via Prototypes. In Proceedings of the 25th ACM SIGKDD International Conference on Knowledge Discovery and Data Mining, 2019.
Karpathy et al., "Visualizing and understanding recurrent networks," arXiv:1506.02078v2 [cs.LG] Nov. 17, 2015.

(Continued)

*Primary Examiner* — Jennifer N Welch
*Assistant Examiner* — Ashley M Fortino
(74) *Attorney, Agent, or Firm* — Brooks Kushman P.C.

(57) ABSTRACT

A deep sequence model with prototypes may be steered. A prototype overview is displayed, the prototype overview including a plurality of prototype sequences learned by a model through backpropagation, each of the prototype sequences including a series of events, where for each of the prototype sequences, statistical information is presented with respect to use of the prototype sequence by the model. Input is received adjusting one or more of the prototype sequences to fine-tune the model. The model is updated using the plurality of prototype sequences, as adjusted, to create an updated model. The model, as updated, is displayed in the prototype overview.

18 Claims, 10 Drawing Sheets

(56) References Cited

OTHER PUBLICATIONS

Min et al., "Parametric t-Distributed Stochastic Exemplar-Centered Embedding," Joint European Conference on Machine Learning and Knowledge Discovery in Databases. Springer, Cham, 2018.
Hochreiter et al., "Long Short-Term Memory." Neural Computation 9(8): 1735-1780, 1997.
Bostock et al., Protovis: A Graphical Toolkit for Visualization, IEEE Transactions on Visualization and Computer Graphics, Oct. 23, 2009.
Fu et al., PEARL: Prototype LEArning Via Rule Lists, ICLR 2019 Conference Blind Submission, Sep. 27, 2018.
Li et al., Deep Learning for Case-Based Reasoning Through Prototypes: A Neural Network That Explains Its Predictions, 32nd AAAI Conference on Artificial Intelligence (AAAI-18), Oct. 13, 2017.

\* cited by examiner

FIG. 1

(A) Overview 112

| 62 | almost | N | hours | for | delivery | | restaurant | is | <other> |
| 32 | N | hours | to | get | a | <other> | . | food | was |
| 37 | worst | bloody | marys | in | the | airport | . | pass | on |
| 1 | prefer | other | locations | than | going | to | this | one | due |
| 43 | omelet | was | great | ! | ! | ! | pancakes | and | bacon |
| 64 | great | food | . | drive | threw | ! | . | your | drive |
| 23 | this | place | was | pleasant | service | was | fast | and | unlimited |
| 3 | <other> | food | . | the | atmosphere | is | amazing | service | is |
| 61 | great | food | amazing | service | and | one | hell | of | a |
| 25 | best | bbq | and | service | i | have | had | in | awhile |
| 19 | best | . | fresh | . | great | service | and | ambience | . |
| 60 | great | place | to | grab | an | excellent | meal | at | a |

(B) Detail

∨ 61 | great | food | amazing | service | and | one | hell | of | a (B1)
| | great | food | and | awesome | staff | . | make | sure | you |
| | great | place | great | food | and | service | . | chick | katsu |
| | great | service | great | food | decently | priced | menu | . | try |

∨ 43 | omelet | was | great | ! | ! | ! | pancakes | and | bacon (B2)
| | this | place | closes | early | on | weekdays | ! | very | disappointed |
| | this | place | blows | ! | dirty | loud | disorganized | unwelcoming | environment |
| | love | blues | service | okay | but | best | <other> | ever | ! |

STEERING DEEP SEQUENCE MODEL WITH PROTOTYPES

TECHNICAL FIELD

The present disclosure relates to steering a deep sequence model with prototypes.

BACKGROUND

Deep learning models are being adopted in sequence data analysis to assist in decision-making. Deep sequence models, such as recurrent neural networks (RNN), can be used to predict patient status by modeling electronic health records (EHR), analyzing the topic or sentiment of texts, and understanding audio signals. Such techniques have achieved state-of-the-art results in various applications.

Despite their performance, RNNs are often considered "black boxes." This is due to their complex architecture and to the massive size of the model weights. This lack of interpretability limits adoption of RNNs in many critical decision-making scenarios, where an understanding of the reasons behind a prediction may be required. As one example, recent data protection regulations in the European Union grant individuals the "right to explanation" for decisions made by machine learning systems (see, e.g., Voigt, Paul, and Axel Von dem Bussche, "The EU General Data Protection Regulation (GDPR)," *A Practical Guide, 1st Ed., Cham: Springer International Publishing* (2017)).

In addition to interpretability, another challenge with deployment of deep sequence models is steerability. Many applications could benefit from supporting the domain experts to directly steer the models with their insights and domain-knowledge. For example, a doctor with rich experience with heart disease would have valuable knowledge that can benefit a heart failure risk prediction model. Although end-to-end training of deep neural networks can alleviate a need to manually curate data features, training alone fails to provide the functionality for expert users to steer the model.

SUMMARY

In one or more illustrative examples, a method is described for steering a deep sequence model with prototypes. The method includes displaying a visual interface, the visual interface including a prototype overview showing a plurality of prototype sequences learned by a model through backpropagation, each of the prototype sequences including a series of events, where for each of the prototype sequences, statistical information is presented with respect to use of the prototype sequence by the model. The method also includes receiving input to the visual interface, the input adjusting one or more of the prototype sequences to fine-tune the model, and updating the model using the plurality of prototype sequences, as adjusted, to create an updated model. The method further includes displaying in the visual interface, updates to the plurality of prototype sequences as identified by the updated model.

In one or more illustrative examples, a system is described for steering a deep sequence model with prototypes. The system includes a display device; a storage configured to maintain prototype sequences and a model; and a processor, in communication with the display device and storage. The processor is programmed to display a visual interface, the visual interface including a prototype overview showing a plurality of prototype sequences learned by a model through backpropagation, each of the prototype sequences including a series of events, where for each of the prototype sequences, statistical information is presented with respect to use of the prototype sequence by the model. The processor is also programmed to receive input to the visual interface, the input adjusting one or more of the prototype sequences to fine-tune the model; update the model using the plurality of prototype sequences, as adjusted, to create an updated model; and display in the visual interface, updates to the plurality of prototype sequences as identified by the updated model.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A machine learning approach that is both interpretable and steerable allows the domain experts to gain insights from the model and also refine the model with their knowledge, creating a mutually beneficial feedback loop. As explained in detail herein, the described approaches allow a user to steer sequence learning models without relying on machine learning practitioners as intermediaries. The disclosed concepts utilize a sequence learning model which combines prototype learning and deep neural networks for both interpretability and predictive accuracy. A key component of the model is a small set of exemplar cases (referred to herein as prototypes) which are constructed using historical data. An interactive visual interface may be designed to assist experts in various application domains to inspect, critique, and revise the sequence prototypes learned by the model. By making these revisions to the model, the functionality of the computer system utilizing the model may be improved.

An improved visual interface may be configured to support iterative model refinement for end-users with a limited background in machine learning. The visual interface provides a set of visualizations and interactions to help the end users inspect, critique, and revise the prototypes in a model. In particular, the visual interface utilizes a backbone deep sequence model which is inherently interpretable. (Further information on such a model is described in detail in the publication Yao Ming, Panpan Xu, Huamin Qu, and Liu Ren, "Interpretable and Steerable Sequence Learning via Prototypes," *Proceedings of the 25nd ACM SIGKDD International Conference on Knowledge Discovery and Data Mining*, which is incorporated herein by reference in its entirety.) The model may employ prototype learning, which is a form of case-based reasoning. In doing so, the model utilizes a problem-solving process involving consulting similar cases in the past to formulate solutions for new situations. In particular, the model constructs a small set of prototypical sequences from the original training data. New inputs may be compared with the prototypes in the latent space of an encoder network for prediction output. The learned prototypes, accordingly, give a concise summary of the sequences as their number is usually much smaller than the size of the original training data. Further aspects of the model and its use are discussed in detail herein.

Figure 1:
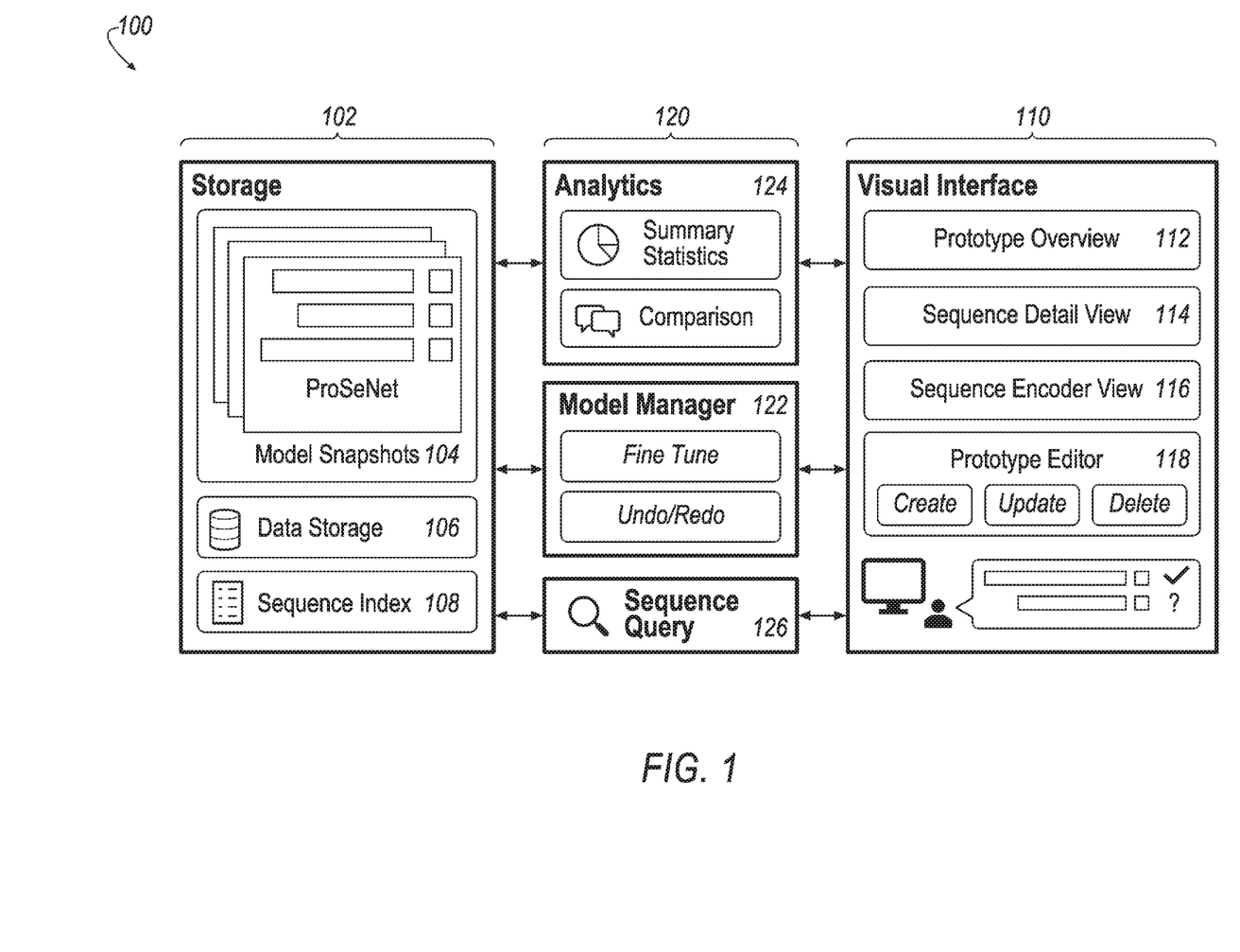
FIG. 1 illustrates an example architecture of a system for providing a visual interface for steering a deep sequence model with prototypes.

FIG. 1 illustrates an example architecture of a system 100 for providing a visual interface 110 for steering a deep sequence model 104 with prototypes. As shown, the system 100 includes a storage layer 102, a service layer 120, and the visual interface 110. It should be noted that the illustrated architecture is only one example, and different layouts of elements or combinations of elements may be used.

The storage layer 102 may be configured to maintain historical snapshots of the model 104. The storage layer 102 may also maintain a data storage 106 containing the training, validation, and test data to support incremental model 104 training. The storage layer 102 may also maintain a sequence index 108 which may be queried and visualized.

The visual interface 110 contains a rich set of visualizations to support model 104 inspection and a series of user interactions to support efficient user feedback to the model 104. As discussed in detail below, the visual interface 110 may include a prototype overview 112, a sequence detail view 114, a sequence encoder view 116, and a prototype editor 118. The prototype editor 118 may allow the user to create, update, and delete prototypes.

The service layer 120 may include a model manager 122, an analytics component 124 and a sequence query component 126. The model manager 122 may be configured to communicate between the storage layer 102 and the visual interface 110. The model manager 122 may be configured to fine-tune the model 104 according to user input received via the visual interface 110. The model manager 122 may further support undo or redo functionality.

The analytics component 124 may also be configured to communicate between the storage layer 102 and the visual interface 110. The analytics component 124 may be configured to collect statistical summaries which can be displayed on the visual interface 110 to help users better understand the model 104 behavior. The analytics component 124 may also perform comparisons between different snapshots of the model 104 to help track the changes.

The sequence query component 126 may also be configured to communicate between the storage layer 102 and the visual interface 110. Through the sequence query component 126, users can search the sequence index 108 in the data storage 106 to create new prototypes.

The algorithms and/or methodologies of one or more embodiments described herein may be implemented using a computing platform. The computing platform may include memory, processor, and non-volatile storage. The processor may include one or more devices selected from high-performance computing (HPC) systems including high-performance cores, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory. The memory may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information. The non-volatile storage may include one or more persistent data storage devices such as a hard drive, optical drive, tape drive, non-volatile solid state device, cloud storage or any other device capable of persistently storing information.

The processor may be configured to read into memory and execute computer-executable instructions residing in software of the non-volatile storage and embodying algorithms and/or methodologies of one or more embodiments as discussed herein. The software may include operating systems and applications. The software may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL. In one embodiment, PyTorch, which is a package for the Python programming language, may be used to implement at least a portion of the code of one or more embodiments.

The program code embodying the algorithms and/or methodologies described herein is also capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Figure 2A:
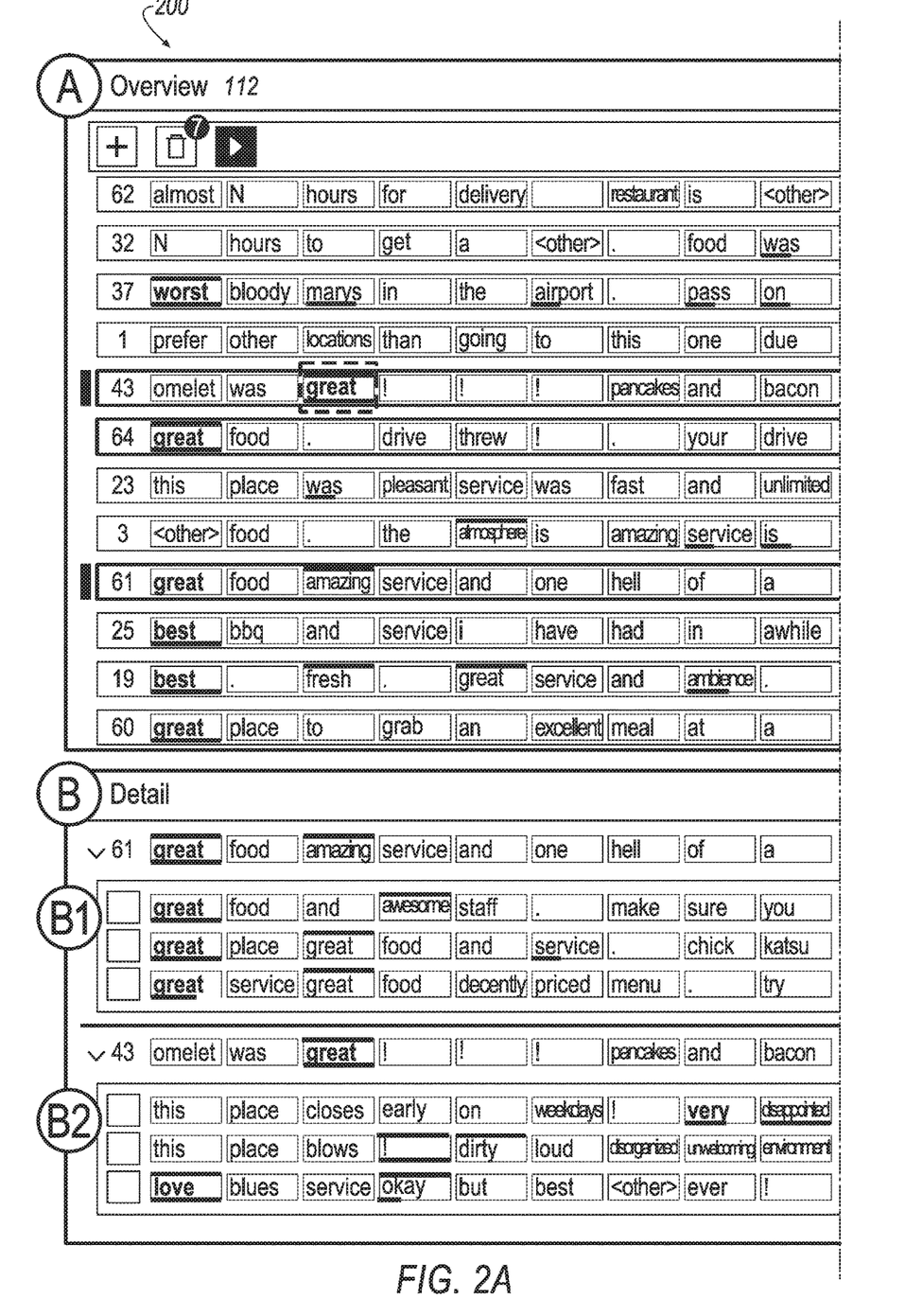
FIGS. 2A, 2B, and 2C collectively illustrate an example of the visual interface of the system.
Figure 2B:
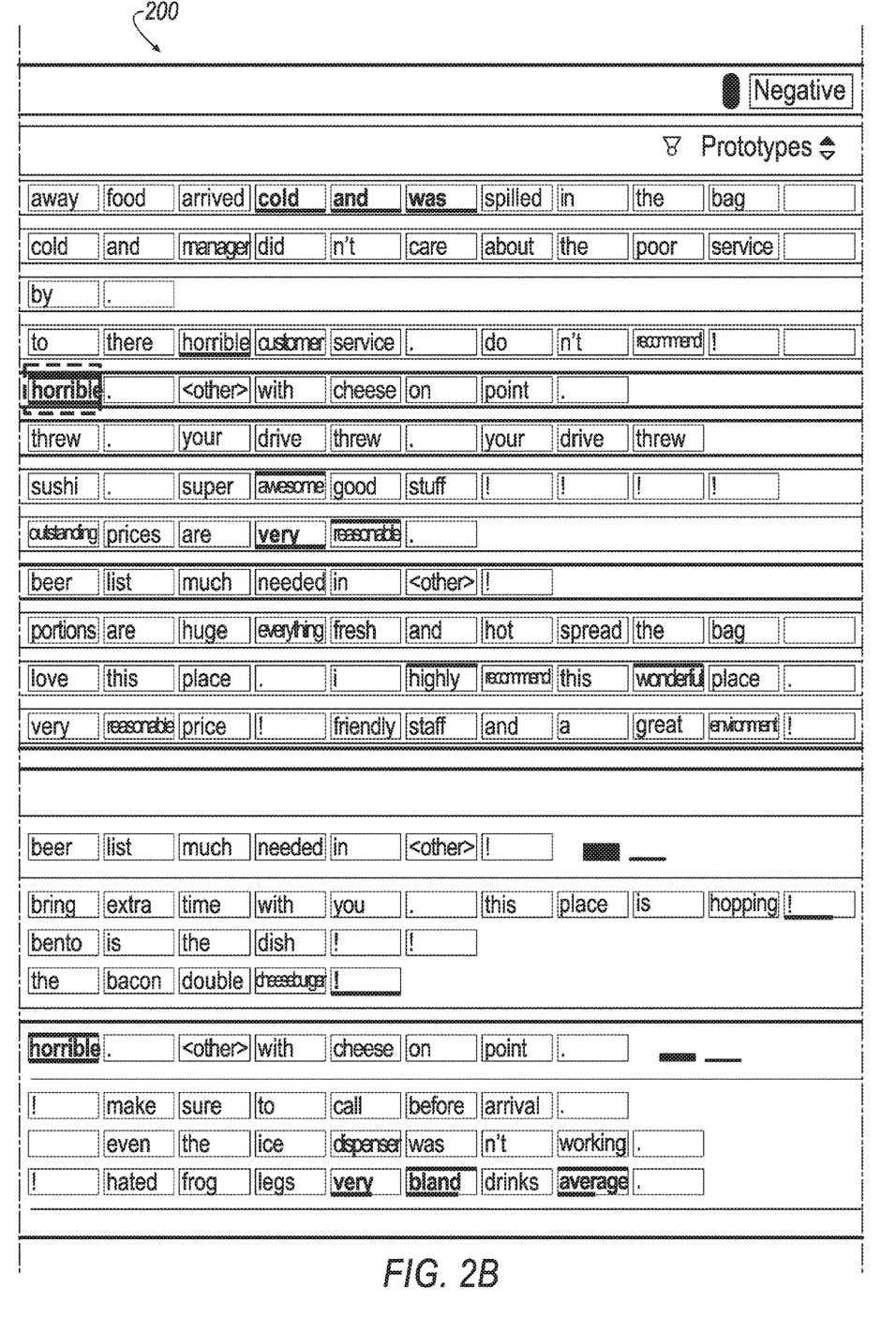
Figure 2C:
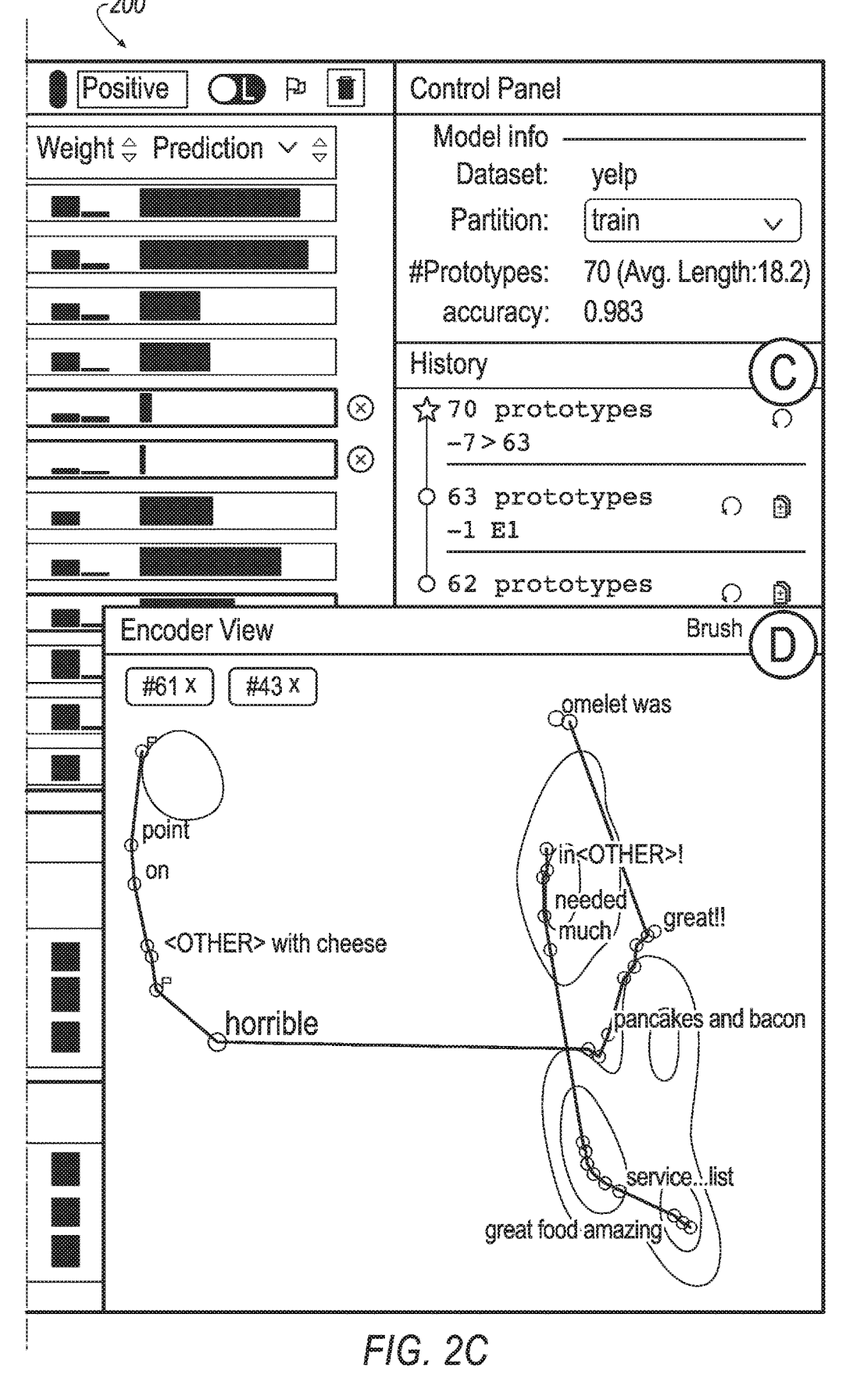

FIGS. 2A, 2B, and 2C collectively illustrate an example 200 of the visual interface 110 of the system 100. As shown, the visual interface 110 includes the prototype overview 112, the sequence detail view 114, an editing graph, and a sequence encoder view. The visual interface 110 may be provided to a display device, which may include an electronic display screen, touchscreen, projector, or any other suitable device that reproduces a graphical display. It should be noted that the illustrated layout is only one example, and different layouts of elements or combinations of elements may be used.

As shown at (A), the prototype overview 112 may be a main component of the visual interface 110. The prototype overview 112 may be configured to display the prototypes in the model 104, accompanied by rich information to help users understand the model 104 behavior. As shown, each prototype may be visualized as a sequence of horizontally-arranged rectangular events with event names displayed as text labels. Additionally, in the illustrated example, the border color of each of the events encodes the type of the event. Notably, different color encoding schemes may be used for different application scenarios.

The prototype overview 112 may be further configured to allow for the visualization of prototype weight. In an example, the prototype overview 112 may include a weight column, where, for each prototype, the column displays a value indicative of the relative importance of the respective prototype in determining the different possible model 104 outputs. In classification tasks, the column shows the strengths of the association between the prototypes and different class labels. The values displayed may be the corresponding entries in the weight matrix W of the fully connected layer $f_t$ of the model 104. More specifically, $W_{ij}$ is the importance of the prototype $p_i$ in determining the model 104 output labeled as j. The categorical colors differentiate the labels in the classification task. For instance, negative weights are illustrated in a first color or appearance, while positive weights are indicated in a second color or appearance.

The prototype overview 112 may also be configured to summarize prediction performance. For instance, for each prototype the system 100 may compute all the data instances that are closest to it, where those instances may be referred to as the neighborhood of the prototype. A summary of the model 104 decisions on those nearest neighbors may be illustrated in the prototype overview 112 as a stacked horizontal bar displayed in the prediction column. The width of the bar may represent the total number of neighborhood instances, while the categorical color may indicate the decisions made by the model 104 in the classification task (similar to as shown with respect to the weight column). The height of the rectangle may encode the score. In the illustrated example, solid blocks are used to indicate correct classification results and patterned blocks to indicate errors (although different approaches may be utilized in other examples). The width of each colored block is shown to represent the number of instances that are correctly or incorrectly classified to the corresponding label. This visual encoding helps users to quickly identify important prototypes that represent a large number of instances as well as prototypes which are usually associated with inaccurate prediction results. The prototype overview 112 may also illustrate incremental changes made responsive to user edits of the prototypes as well as any corresponding updates to the model 104.

The prototype overview 112 may also be configured to allow users to reorder the list of prototypes. The list of prototypes can be sorted based on several different criteria to address a variety of analytic tasks. By default, the system 100 sorts the prototypes based on their similarity. To do so, the system 100 may perform a hierarchical clustering of the prototypes based on their distances in the latent space and may obtain a linear order accordingly. The sorting may accordingly be based on similarity group prototypes that resemble each other, aiding in the spotting of redundancy. The prototype overview 112 may also be configured to allow users to sort the prototypes according to accuracy of the prediction results. This may allow the problematic prototypes to be brought to attention for further analysis.

The prototype overview 112 may also be configured to allow for filtering of the prototypes. The number of visible prototypes can be reduced by filtering in various ways. In one example, the user may specify a few events and the list will only display prototypes containing one of the events. In another example, the user selects a prototype and the list will display the top-k prototypes most similar to it in the latent space. Filtering by event may help in narrowing down a search if there is interest in a particular prototype. Filtering by similarity may help in identifying potential duplicate prototypes. In one example implementation, k may be set to 10.

Figure 3:
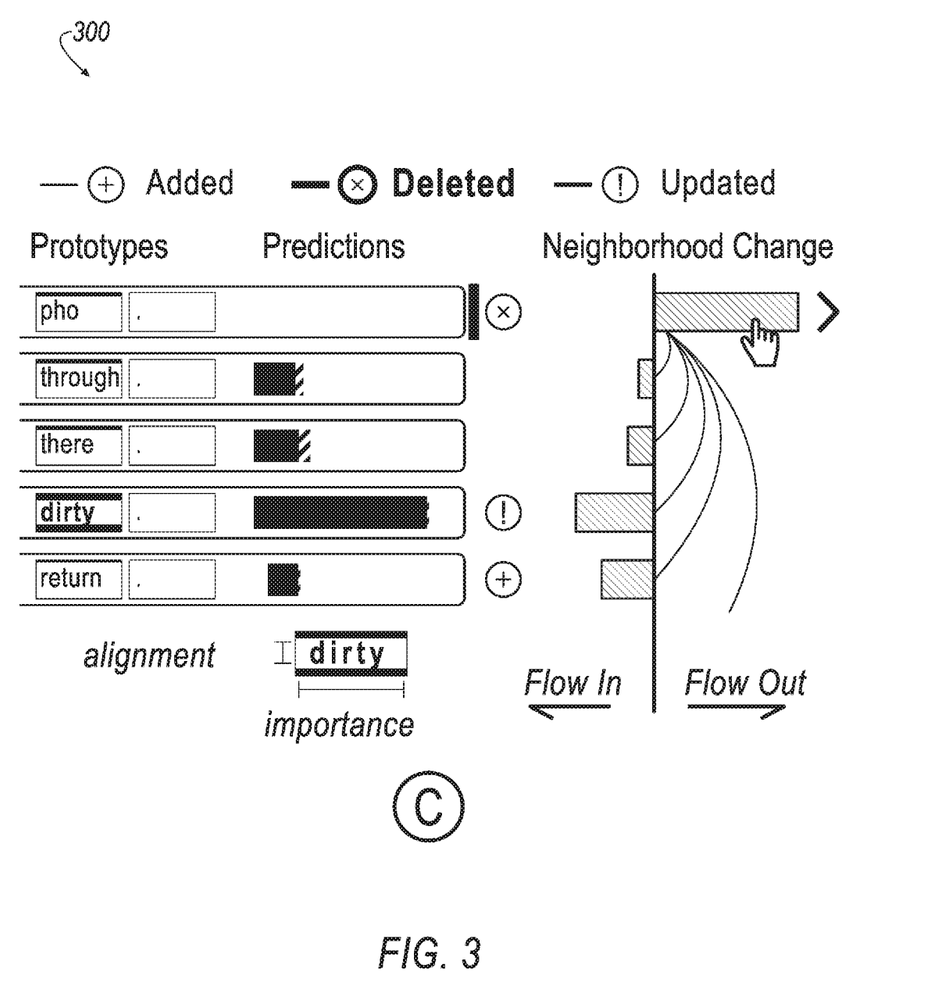
FIG. 3 illustrates an example comparison mode for a prototype overview of the visual interface of the system.

The prototype overview 112 may also be configured to allow for visualization of event importance. This event importance may be displayed, in an example, as a horizontal bar at the bottom of the rectangle (FIG. 3). The length of the bar may be proportional to an importance score to help highlight the most critical events. The importance of each event e in a prototype p may be calculated with a leave-one-out strategy. More concretely, an algorithm may perform the following operations for each e:

1. Remove e from prototype p to obtain a new sequence p'.
2. Compute the distance between the original prototype p and p' in the latent space defined by the sequence encoder r.
3. Convert the distance to a normalized value between 0 and 1, where O indicates that removing e has no effect on the latent representation of p. The normalized value is the importance of e.

The intuition is that the more important an event e is, the farther the prototype will be pushed away from its original position in the latent space when removing e. As shown in FIGS. 2A and 2B, the long bars below the words "great" and "horrible" indicate those words are highly important in prototype #43. The prototype overview 112 may also display how well each of the events in a prototype aligns with those in the neighborhood sequences.

FIG. 3 illustrates an example comparison mode 300 for a prototype overview of the visual interface of the system. The comparison mode 300 may be used to allow users to visualize model 104 differences. For example, users can understand and analyze the changes after updating the prototypes in the prototype overview via use of the comparison mode 300.

Similar to some popular code or document version comparison tools, the system 100 may highlight the prototypes with different colors to indicate different types of edits that were made in the prototype overview 112. As shown in FIG. 3, added, deleted and edited prototypes are marked with a green circle including a green plus, a red circle including a red x, and a blue circle including a blue exclamation point, respectively. These visual cues may help users to keep track of the changes.

After the edits are committed, the model 104 may be fine-tuned by the system with the updated prototypes. It is therefore useful for these changes in the model 104 to be visualized after the model 104 has been fine-tuned. Directly comparing the model 104 parameters may not be helpful since they can be extremely difficult to interpret. However, because the system 100 utilizes a deep sequence model which is inherently interpretable, the decisions of the model 104 are made based on the proximity of the inputs to the prototypes. Thus, the system 100 may visualize the changing neighborhoods of each prototype to summarize the difference in the model 104 before and after the update.

To activate the comparison mode 300, the user interface 110 may include a compare control on a historical interaction record in the editing graph as shown in FIG. 2C. Responsive to selection of the compare control, an additional column may then be added in the right of the prototype overview 112 to display the number of instances flow-in and flow-out from the neighborhood of each prototype. As shown in FIG. 3, this may be illustrated, for instance, as two horizontally-stacked bar-charts. The bar on the right indicates the data instances flowing out from the neighborhood of a prototype, while the bar on the left indicate the data instances flowing in. The lengths of the bars may be proportional to the corresponding number of instances. The colored blocks may indicate classification results given by the updated model 104. As the user hovers over a prototype or a bar, the visualization may display curved edges connecting the origins and destinations of the incoming and outgoing flows. For instance, in FIG. 3 these edges are being displayed for the top prototype, which is being hovered over.

The user interface 110 may also include the editing graph, as mentioned above. As shown at (C) of FIG. 2C, the editing graph may be configured to display a history of edits that were performed to the model 104 using the visual interface 110. The editing graph may, accordingly, help users to track and reverse their edits to the model 104, if necessary.

Figure 4:
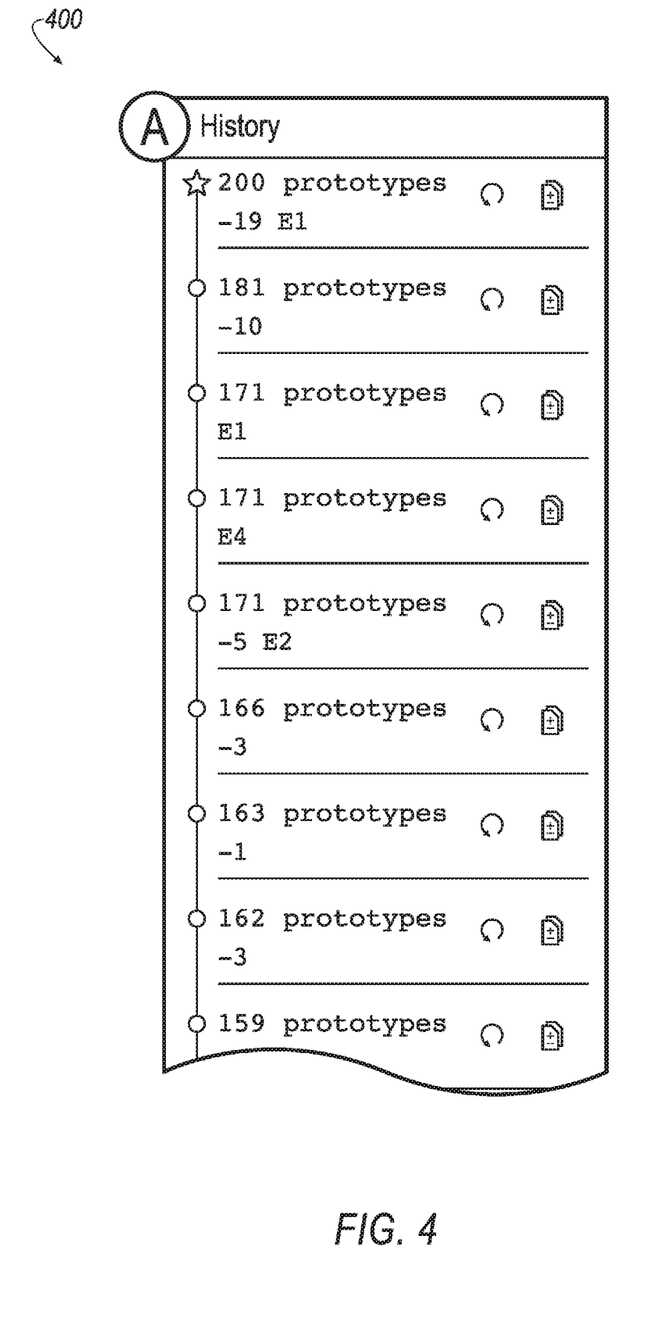
FIG. 4 illustrates an example detail of an editing graph of the visual interface of the system.

FIG. 4 illustrates an example 400 detail of the editing graph of the visual interface 110 of the system 100. As shown in FIG. 4, and with continuing reference to FIGS. 1 and 2A, 2B, and 2C, the system 100 may visualize the history of the model 104 edits as a directed acyclic graph. Each node in the graph may represent a snapshot of the model 104. The nodes can be revisited and edited again to create alternative branches. The directed links in the graph may indicate editing relations. Additionally, each node may show a summary of the edits that were made, e.g., indicating how many prototypes have been added, deleted or edited in each snapshot. Accordingly, the editing graph provides traceability in the system 100.

Referring back to FIG. 2C, as shown at (D) the sequence encoder view may be configured to display the hidden state information in the encoder layer for advanced users to analyze sequence alignment and to compare different prototypes. This, accordingly, allows the system 100 to visualize hidden state changes in the sequence encoder r of the system 100. This further allows experienced users to inspect the internals of the model 104 and to edit the prototypes based on insights gained from the hidden state visualization.

The design of the sequence encoder view is centered around the visual representation of prototypes, similar to the other views. More specifically, the sequence encoder view visualizes the hidden state changes of the prototypes when they pass through the sequence encoder. Since the hidden states are high-dimensional vectors, a dimension-reduction technique is used to project the hidden states onto a 2D plane. The projected hidden states of the same prototype are connected to form a trajectory. The trajectories help users identify significant changes in the hidden state vector, which usually indicate the occurrence of key events or substructures in a sequence (see, e.g., Andrej Karpathy, Justin Johnson, and Fei-Fei Li, "Visualizing and understanding recurrent networks," *arXiv preprint arXiv:* 1506.02078 (2015)). For instance, in the example sequence encoder view in FIG. 2B, the word "horrible" pushes the hidden state towards left significantly, indicating that it is a critical word in the sentence.

To visualize the distribution of the prototypes' neighbors, the system 100 may also project their hidden state information on the same 2D plane. However, projecting such a large amount of data (hidden states of thousands of sequences x tens of events) at the same time may consume significant computational resources (especially for algorithms like t-SNE). Thus, the system 100 may employ a parametric nonlinear projection technique. One example of a parametric nonlinear projection technique is kernel t-SNE (Min, Martin Renqiang, Hongyu Guo, and Dinghan Shen, "Parametric t-distributed stochastic exemplar-centered embedding," *Joint European Conference on Machine Learning and Knowledge Discovery in Databases. Springer, Cham,* 2018). The method trains a parametric projection function with a subset of the data named as skeleton points (e.g., the hidden states of prototype sequences in the implementation of the system 100). The remaining points may then be projected on demand without further optimization using the learned function, which can be completed in linear time.

Thus, the design of the projection visualization combines the trajectories of the prototypes and the contour maps which summarize the hidden state distribution of their neighborhoods. This visualization helps identify redundant prototypes whose neighborhood contour maps may have significant overlap with each other. It can be observed that some projected points are too close on the trajectory and the labels may overlap with each other. Therefore, the system 100 may group the points based on their proximity and may display labels for the points collectively near the cluster.

Referring back to FIGS. 2A, 2B, and 2C, as shown at (B) the sequence detail view 114 may be configured to display the neighborhood instances of selected prototypes in the prototype overview 112, as well as the prediction results. A sequence query/edit widget may be displayed on demand to help users query the data storage 106 using a combination of fuzzy and exact phrase matching, as well as to create and edit potential prototypes.

Figure 5A:
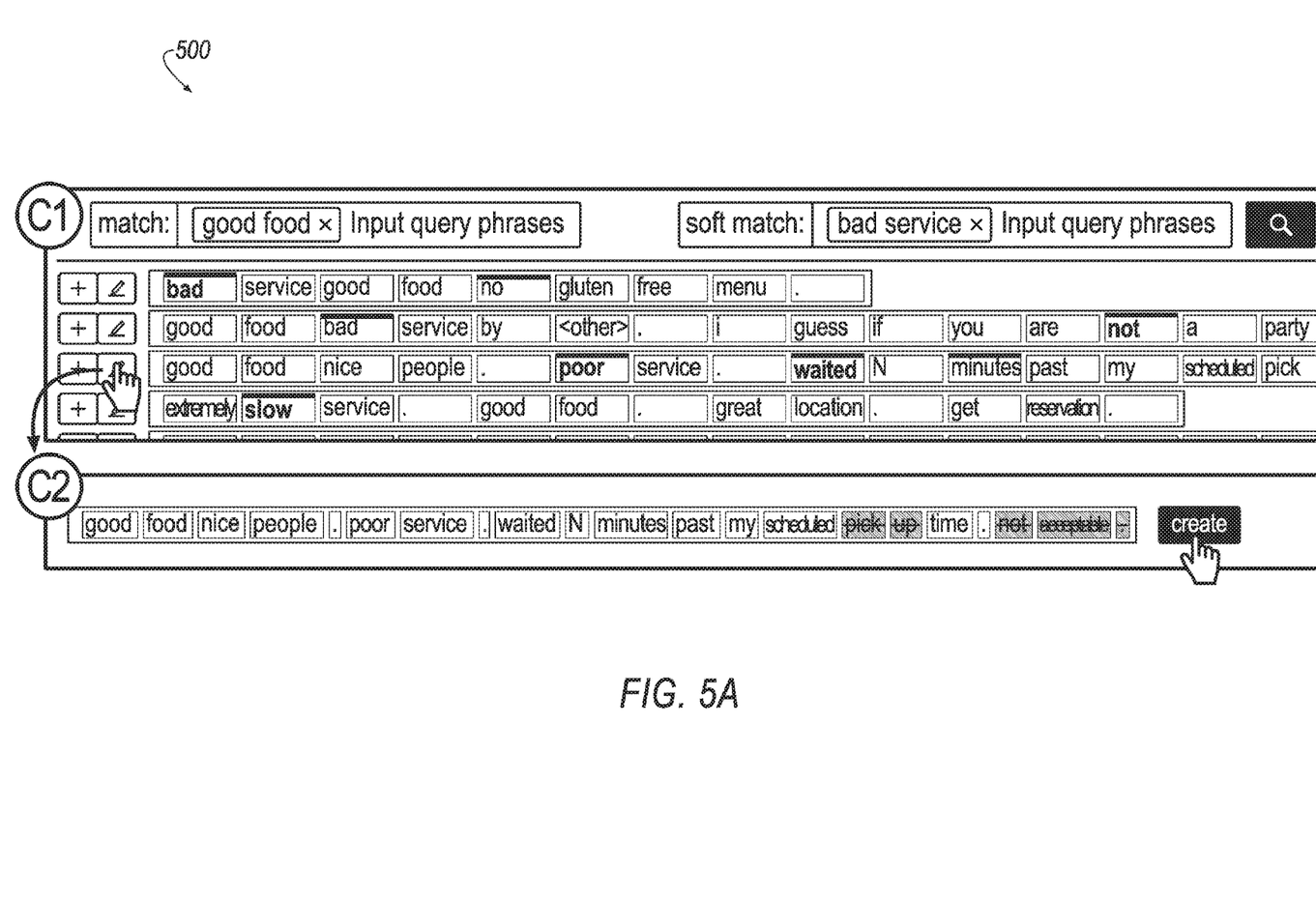
FIGS. 5A and 5B collectively illustrate an example detail of a sequence query/edit widget of the of the visual interface of the system.
Figure 5B:
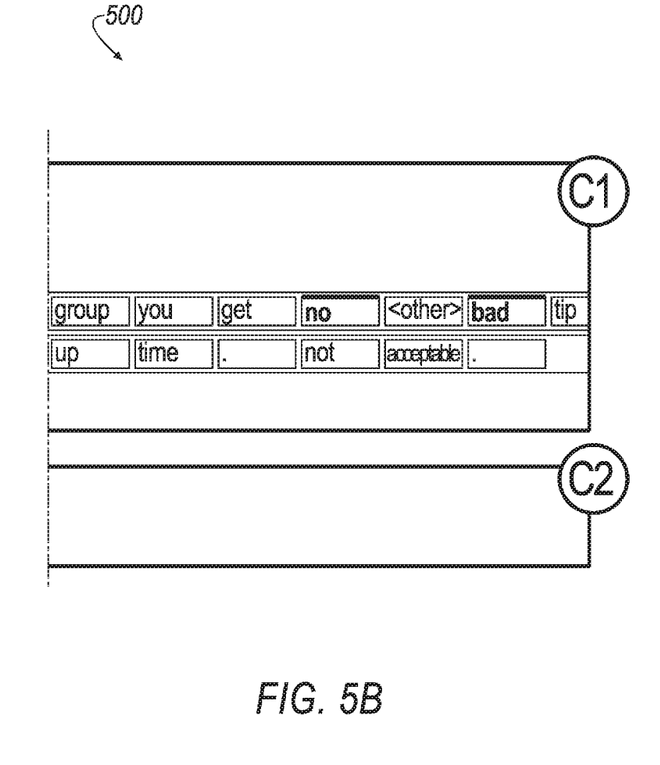

FIGS. 5A and 5B collectively illustrate an example 500 detail of the sequence query/edit widget of the visual interface 110 of the system 100. As noted, the system 100 supports a rich set of user interactions to help with the refinement of the model 104 by adding, deleting, and revising the prototypes. The sequence query/edit widget may be used to perform further useful interactions with the model 104.

In one additional aspect, the visual interface 110 may support direct drag-and-drop interactions. Many of the operations in the system 100 can be completed through direct drag-and-drop. For example, a user may drag-and-drop prototypes to the recycle bin to remove them, to the sequence detail view 114 to inspect the neighborhood instances and to the projection view (sequence encoder view 116) to analyze the hidden state distributions. The interaction design utilizes physical metaphors, and the users can perform a variety of tasks easily through direct manipulation.

As shown at C2 in FIGS. 5A and 5B, the system 100 may provide a sequence editor. The sequence editor may show a representation of a specific sequence chosen to be edited by the user (e.g., by selection of the pencil/edit control for the corresponding sequence). Using the sequence editor, the user may directly add and remove events to an existing prototype without having to retype the event in a new form.

As shown at C1 in FIGS. 5A and 5B, the system 100 may further provide a search interface to help users create new prototypes using a large amount of training data. The search interface may display a ranked list of sequences, given a search phrase from the user. In particular, the user may specify a subsequence s that the user would like to see in a new prototype. The system 100 may then uses the subsequence s to match against the sequences in the data storage 106.

The system 100 supports two matching schemes: exact matching and soft matching, which can be used together or separately. In exact matching, a sequence s' in the data storage 106 may be scored by len(LCS(s', s))/len(s), where LCS(•,•) computes the longest common subsequence between two inputs. Soft matching does not require the word to be exactly the same. Instead, when performing soft matching the system 100 computes the latent representations of the most frequent n-grams in the training sequences using the sequence encoder r. During the search, the system 100 compares the latent representations of the query s with the n-grams, and returns the sequences containing the matched n-grams. Comparison in the latent space, accordingly, allows the users to find semantically-related sequences.

Figure 6:
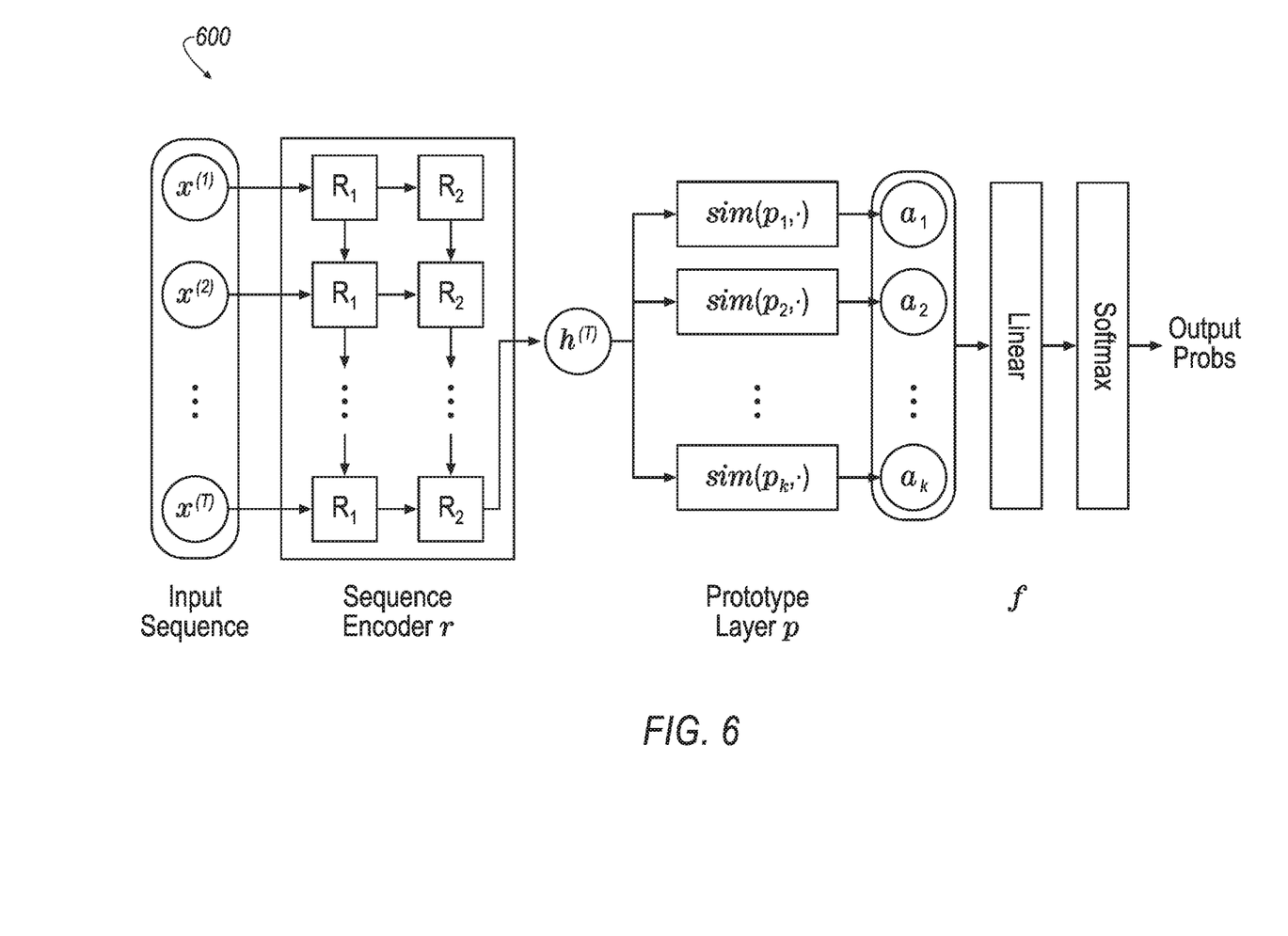
FIG. 6 illustrates a detailed view of the model for use in the system.

FIG. 6 illustrates a detailed view of the model 104 for use in the system 100. The model 104 combines deep sequence networks' capability of modeling complex temporal dependencies with the interpretability of prototype-based reasoning. As shown, the model 104 includes three major components: a sequence encoder r, the prototype layer p, and the fully connected layer f with softmax outputs for classification tasks.

The sequence encoder r may be a deep recurrent neural network. The sequence encoder r converts variable length sequences into a fixed length vector representation e=r(s), $e \in \mathbb{R}^m$. The prototype layer p compares the latent vector representation e obtained through the encoder network with k prototype vectors $p_i \in \mathbb{R}^m$, i=1, . . . , k. Through appropriate transformations, a vector of similarity scores may be obtained as $a=p(e), a_i \in [0,1]$, where $a_i$ is the similarity score between the input sequence and the prototype $p_i$ and $a_i=1$ indicates that the input sequence has identical embedding with prototype $p_i$. The fully connected layer f with softmax output computes the eventual classification results using the similarity score vector a. The entries in the weight matrix in f may be constrained to be non-negative for better interpretability. The similarity scores a together with the entries in the weight matrix can be used to explain the classification results.

The prototype vectors $p_i$ learned through backpropagation are not readily explainable as they may not correspond to sequences in real-world applications. Therefore, the optimization algorithm may perform prototype projection for every few training epochs, which essentially identifies sequences from the original training data that are most similar to the prototype vectors in the latent space. The prototype vectors may then be updated with the latent vector representations of these sequences.

Figure 7:
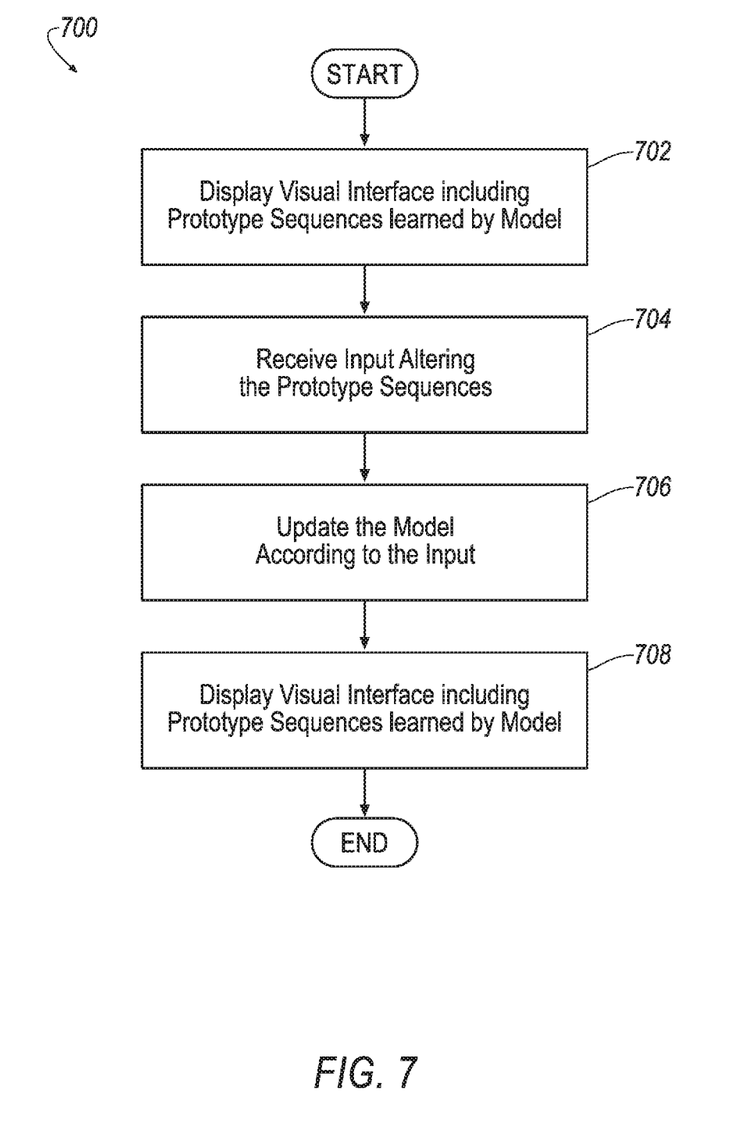
FIG. 7 illustrates an example process for providing a visual interface for steering a deep sequence model with prototypes.

FIG. 7 illustrates an example process 700 for providing a visual interface 110 for steering a deep sequence model 104 with prototypes. In an example, the process 700 may be performed by the system 100 as shown in FIG. 1.

At operation 702, the system 100 displays the visual interface 110. The visual interface 110 may include the prototype overview 112 showing a plurality of prototype sequences learned by the model 104 through backpropagation, each of the prototype sequences including a series of events, where for each of the prototype sequences, statistical information is presented with respect to use of the prototype sequence by the model 104.

At operation 704, the system 100 receives input to the visual interface 110. The input includes an adjustment to one or more of the prototype sequences to fine-tune the model 104. As some examples, the input may include adding or removing events from one or more of the prototype sequences, deleting redundant prototype sequences, and/or adding new prototype sequences.

At operation 706, the system 100 updates the model 104 using the plurality of prototype sequences, as adjusted, to create an updated model 104. At operation 708, the system 100 displays, in the visual interface 110, updates to the plurality of prototype sequences as identified by the updated model 104. After operation 708, the process 700 ends.

As compared to prior systems and methods, the described approach adopts a human-in-the-loop approach to build a sequence prediction model. Moreover, a set of visualizations are used to help users better understand and inspect the sequence prototypes. Further, novel interaction techniques have been designed to help the user add, remove, and edit the sequence prototypes. The interactions are supported by intelligent query services. Accordingly, the visual interface 110 allows for such smart interactions to be introduced into such systems.

Thus, the described system 100 provides a novel human-model interaction scheme which helps refine the learned knowledge of both the user and the model 104. The novel visual analytics system 100, accordingly, allows human-guided refinements of a deep sequence network through interactively editing a set of prototypical sequences used in inference. Moreover, a visualization design is presented that combines projection techniques and contour maps to facilitate the advanced analysis of sequence distribution in latent space.

Notably, the described techniques may be applied to apply to any types of sequence data. As described above, the described interactive sequence models may be used to classify sentiment in sequence data in the form of textual reviews. As another practical application, the described techniques may be applied to traces of web traffic from users. Such data may be used to classify whether users will perform a purchase or not based on their sequence of browsing history.

As yet another practical application, the described techniques may be applied to vehicle bus traffic to aid in the interactive analysis of models for reciting future events in vehicles. For instance, signals such as CAN bus traffic may be collected from vehicles into sequence data. Based on these events captured in this data, models may be used to predict whether a fault is likely to occur for the vehicle. These models may also be readily examined and refined using the disclosed human-model interaction scheme.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for steering a deep sequence model with prototypes, comprising:
    displaying a visual interface, the visual interface including a prototype overview showing a plurality of prototype sequences learned by a model through backpropagation, each of the prototype sequences including a series of events, where for each of the prototype sequences, statistical information is presented with respect to use of the prototype sequence by the model;
    computing, for each event of the series of events, a respective event importance score computed using a leave-one-out strategy where a respective event is removed from a prototype sequence, a distance in a latent space of the modes is computed between the prototype sequence and the prototype sequence with the respective event removed, and the distance is normalized into the event importance score indicative of an of effect of removing the event from the prototype sequence;
    displaying in the prototype overview, for each of the events, the respective event importance score;
    receiving input to the visual interface, the input adjusting one or more of the prototype sequences to fine-tune the model;
    updating the model using the plurality of prototype sequences, as adjusted, to create an updated model; and
    displaying in the visual interface, updates to the plurality of prototype sequences as identified by the updated model.

2. The method of claim 1, wherein the statistical information includes a weight column displaying relative importance of each prototype in determining different possible outputs of the model.

3. The method of claim 1, further comprising:
    displaying, in the visual interface, a history of edits to the model as a directed acyclic graph, each node in the directed acyclic graph representing a snapshot of the model, each link between nodes in the directed acyclic graph indicating an edit performed between snapshots of the model, each node including summary information regarding the edit performed to a plurality of prototype sequences between the snapshots of the model.

4. The method of claim 3, further comprising:
    receiving a selection of a first model and a second model from the directed acyclic graph; and
    visualizing, in the visual interface, changes between the first model and the second model as a change in neighborhoods of updated prototype sequences.

5. The method of claim 1, further comprising:
    displaying, in the visual interface, a sequence detail view, the sequence detail view including a neighborhood of instances of a prototype sequence selected from the prototype overview, the neighborhood including a prototype sequence from the plurality of prototype sequences closest in distance to the prototype sequence in latent space of the model.

6. The method of claim 1, further comprising:
    displaying, in the visual interface, a sequence encoder view, the sequence encoder view visualizing hidden state information of an encoder layer of the model, the displaying including using dimension reduction to project hidden state vectors of the model onto a 2-dimensional (2D) plane, projecting hidden states of each event of a prototype sequence of the plurality of prototype sequences onto the 2D plane, and connecting the events of the prototype sequence to form a trajectory.

7. The method of claim 1, further comprising:
    receiving a selection of one of the plurality of prototype sequences from the visual interface;
    displaying, to the visual interface, a sequence editor configured to receive user input to add and remove events from the one of the plurality of prototype sequences; and
    one or more of adding or removing events from one of the plurality of prototype sequences responsive to the user input being received by the visual interface.

8. The method of claim 1, further comprising:
    receiving a specification of a subsequence to search for in a database of sequences;
    searching the database of sequences to identify sequences having a longest common subsequence that includes the subsequence; and
    displaying a ranked list of results responsive to the searching.

9. The method of claim 1, further comprising:
    receiving, via the visual interface, a specification of a subsequence to search for in a database of sequences;
    computing latent representations of most-frequently-used n-grams in a database of sequences;
    searching the database of sequences by computing latent representations of the subsequence to the latent representations of most-frequently-used n-grams; and displaying, to the visual interface, a ranked list of results containing matching n-grams responsive to the searching.

10. A system for steering a deep sequence model with prototypes, comprising:
a display device;
a storage configured to maintain prototype sequences and a model; and
a processor, in communication with the display device and storage, programmed to:
display a visual interface, the visual interface including a prototype overview showing a plurality of prototype sequences learned by the model through back-propagation, each of the prototype sequences including a series of events, where for each of the prototype sequences, statistical information is presented with respect to use of the prototype sequence by the model;
compute, for each event of the series of events, a respective event importance score computed using a leave-one-out strategy where a respective event is removed from a prototype sequence, a distance in a latent space of the model is computed between the prototype sequence and the prototype sequence with the respective event removed, and the distance is normalized into the event importance score indicative of an effect of removing the event from the prototype sequence;
display in the prototype overview, for each of the events, the respective event importance score;
receive input to the visual interface, the input adjusting one or more of the prototype sequences to fine-tune the model;
update the model using the plurality of prototype sequences, as adjusted, to create an updated model; and
display in the visual interface, updates to the plurality of prototype sequences as identified by the updated model.

11. The system of claim 10, wherein the statistical information includes a weight column displaying relative importance of each prototype in determining different possible outputs of the model.

12. The system of claim 10, wherein the processor is further programmed to:
display, in the visual interface, a history of edits to the model as a directed acyclic graph, each node in the directed acyclic graph representing a snapshot of the model, each link between nodes in the directed acyclic graph indicating an edit performed between snapshots of the model, each node including a summary information regarding the edit performed to a plurality of prototype sequences between the snapshots of the model.

13. The system of claim 12, wherein the processor is further programmed to:
receive a selection of a first model and a second model from the directed acyclic graph; and
visualize, in the visual interface, changes between the first model and the second model as a change in neighborhoods of updated prototype sequences.

14. The system of claim 10, wherein the processor is further programmed to:
display, in the visual interface, a sequence detail view, the sequence detail view including a neighborhood of instances of a prototype sequence selected from the prototype overview, the neighborhood including a prototype sequence from the plurality of prototype sequences closest in distance to the prototype sequence in latent space of the model.

15. The system of claim 10, wherein the processor is further programmed to:
display, in the visual interface, a sequence encoder view, the sequence encoder view visualizing hidden state information of an encoder layer of the model, the displaying including using dimension reduction to project hidden state vectors of the model onto a 2-dimensional (2D) plane, projecting hidden states of each event of a prototype sequence of the plurality of prototype sequences onto the 2D plane, and connecting the events of the prototype sequence to form a trajectory.

16. The system of claim 10, wherein the processor is further programmed to:
receive a selection of one of the plurality of prototype sequences from the visual interface;
display, to the visual interface, a sequence editor configured to receive user input to add and remove events from the one of the plurality of prototype sequences; and
one or more of add or remove events from one of the plurality of prototype sequences responsive to the user input being received by the visual interface.

17. The system of claim 10, wherein the processor is further programmed to:
receive a specification of a subsequence to search for in a database of sequences;
search the database of sequences to identify sequences having a longest common subsequence that includes the subsequence; and
display a ranked list of results responsive to the search.

18. The system of claim 10, wherein the processor is further programmed to:
receive, via the visual interface, a specification of a subsequence to search for in a database of sequences;
compute latent representations of most-frequently-used n-grams in a database of sequences;
search the database of sequences by computing latent representations of the subsequence to the latent representations of most-frequently-used n-grams; and
display, to the visual interface, a ranked list of results containing matching n-grams responsive to the search.

* * * * *

UNITED STATES PATENT AND TRADEMARK OFFICE
CERTIFICATE OF CORRECTION

PATENT NO. : 11,513,673 B2  
APPLICATION NO. : 16/711007  
DATED : November 29, 2022  
INVENTOR(S) : Panpan Xu et al.

Page 1 of 1

It is certified that error appears in the above-identified patent and that said Letters Patent is hereby corrected as shown below:

In the Claims

Column 11, Lines 51-52, Claim 1:  
After "a distance in a latent space of the"  
Delete "modes" and  
Insert -- model --.

Signed and Sealed this  
Fifth Day of March, 2024

Katherine Kelly Vidal  
*Director of the United States Patent and Trademark Office*